US011000052B2

(12) United States Patent
Runge et al.

(10) Patent No.: US 11,000,052 B2
(45) Date of Patent: May 11, 2021

(54) FILLING LINE FOR HEAT-TREATING AND FILLING A LIQUID INTO CONTAINERS

(71) Applicant: Krones AG, Neutraubling (DE)

(72) Inventors: Torsten Runge, Straubing (DE); Katja Enzmann, Regensburg (DE); Roland Amann, Woerth (DE); Roland Feilner, Regensburg (DE); Pascal Luthe-Grundler, Aiglsbach (DE)

(73) Assignee: Krones AG, Neutraubling (DE)

( * ) Notice: Subject to any disclaimer, the term of this patent is extended or adjusted under 35 U.S.C. 154(b) by 126 days.

(21) Appl. No.: 16/332,341

(22) PCT Filed: Jun. 9, 2017

(86) PCT No.: PCT/EP2017/064088
§ 371 (c)(1),
(2) Date: Mar. 11, 2019

(87) PCT Pub. No.: WO2018/046149
PCT Pub. Date: Mar. 15, 2018

(65) Prior Publication Data
US 2019/0230963 A1    Aug. 1, 2019

(30) Foreign Application Priority Data
Sep. 12, 2016 (DE) .......................... 102016217342.1

(51) Int. Cl.
*A23L 3/22* (2006.01)
*A23C 3/033* (2006.01)
(Continued)

(52) U.S. Cl.
CPC ................ *A23L 3/22* (2013.01); *A23C 3/033* (2013.01); *A23C 3/0337* (2013.01); *A23L 2/46* (2013.01);
(Continued)

(58) Field of Classification Search
CPC ..... A23L 3/22; A23L 2/46; A23L 3/16–3/225; A23C 3/033;
(Continued)

(56) References Cited

U.S. PATENT DOCUMENTS 2,327,732 A * 8/1943 McKinnis ................. B67C 3/02
426/399
2,772,979 A * 12/1956 Graves .................... A23C 3/005
426/399
(Continued)

FOREIGN PATENT DOCUMENTS

DE        19536097 A1    4/1997
DE    102007014702 A1    9/2008
(Continued)

OTHER PUBLICATIONS

International Search Report and Written Opinion for International Patent Application No. PCT/EP2017/064088 dated Aug. 29, 2017, in German with English Translation of the Search Report, 12 pages.

*Primary Examiner* — Drew E Becker
(74) *Attorney, Agent, or Firm* — Lowenstein Sandler LLP

(57) ABSTRACT

Filling line for heat-treating and filling a liquid into containers (e.g., bottles), comprising a pre-heater for pre-heating the liquid, a heater for heating the liquid after pre-heating, a cooler for cooling down the liquid after heating, and a filling unit for filling the liquid into the containers, where the filling line is suitable for hot filling and cold filling, where the liquid path from the pre-heater to the filling unit for hot filling differs from the liquid path from the pre-heater to the filling unit for cold filling, and the filling line comprises a switching option for switching between the two liquid paths; and a method for heat-treating and filling containers with a liquid in which such a filling line is used.

18 Claims, 4 Drawing Sheets

(51) Int. Cl.
*A23L 2/46* (2006.01)
*B67C 3/04* (2006.01)
*B65B 25/00* (2006.01)
*B65B 55/14* (2006.01)

(52) U.S. Cl.
CPC ............ *B65B 25/001* (2013.01); *B65B 55/14* (2013.01); *B67C 3/045* (2013.01)

(58) Field of Classification Search
CPC ....... A23C 3/03–3/30337; B67C 3/045; B65B 25/001; B65B 55/14
USPC .................................. 426/399, 520–522, 524
See application file for complete search history.

(56) References Cited

U.S. PATENT DOCUMENTS

| | | | | |
|---|---|---|---|---|
| 2,855,314 | A * | 10/1958 | McK Martin | B65B 55/10 |
| | | | | 426/398 |
| 3,567,470 | A * | 3/1971 | McElroy | A23C 3/033 |
| | | | | 426/522 |
| 3,934,042 | A * | 1/1976 | De Stoutz | A23C 3/076 |
| | | | | 426/248 |
| 5,085,882 | A * | 2/1992 | Rausing | A23L 3/225 |
| | | | | 165/65 |
| 5,290,583 | A * | 3/1994 | Reznik | A23B 5/0055 |
| | | | | 219/771 |
| 5,494,691 | A * | 2/1996 | Sizer | B65B 55/14 |
| | | | | 426/392 |
| 5,863,580 | A * | 1/1999 | Reznik | H05B 3/0009 |
| | | | | 426/237 |
| 6,329,006 | B1 | 12/2001 | Fiss et al. | |
| 8,962,056 | B2 * | 2/2015 | Succar | A23L 33/21 |
| | | | | 426/519 |
| 2005/0112258 | A1 * | 5/2005 | Feldmeier | A23L 3/22 |
| | | | | 426/521 |
| 2006/0137761 | A1 * | 6/2006 | Takeda | B67C 3/045 |
| | | | | 141/59 |
| 2006/0286261 | A1 * | 12/2006 | Wu | A23L 2/56 |
| | | | | 426/594 |
| 2007/0184157 | A1 * | 8/2007 | Stegmaier | A23L 2/46 |
| | | | | 426/399 |
| 2008/0160149 | A1 * | 7/2008 | Nasrallah | A23L 3/16 |
| | | | | 426/521 |
| 2009/0280229 | A1 * | 11/2009 | Constantine | A23L 2/66 |
| | | | | 426/521 |
| 2010/0071802 | A1 | 3/2010 | Clusserath et al. | |
| 2010/0071803 | A1 * | 3/2010 | Clusserath | B67C 3/04 |
| | | | | 141/65 |
| 2010/0139214 | A1 * | 6/2010 | Schulz | B67C 3/045 |
| | | | | 53/440 |
| 2011/0209796 | A1 * | 9/2011 | Feilner | B67C 3/026 |
| | | | | 141/9 |
| 2012/0012226 | A1 | 1/2012 | Runge et al. | |
| 2013/0029020 | A1 * | 1/2013 | Rewolle | B65B 55/14 |
| | | | | 426/407 |
| 2013/0059055 | A1 * | 3/2013 | Richter | A23C 3/033 |
| | | | | 426/521 |
| 2013/0064952 | A1 * | 3/2013 | Cadeo | A23L 3/003 |
| | | | | 426/521 |
| 2013/0230629 | A1 * | 9/2013 | Hathuc | A23J 3/14 |
| | | | | 426/519 |
| 2014/0286822 | A1 * | 9/2014 | Hayakawa | B08B 9/027 |
| | | | | 422/1 |
| 2018/0352823 | A1 * | 12/2018 | Thorsen | A23C 3/033 |
| 2019/0069581 | A1 * | 3/2019 | Feilner | B67C 3/225 |

FOREIGN PATENT DOCUMENTS

| | | |
|---|---|---|
| DE | 102008056597 A1 | 5/2010 |
| DE | 102011082286 A1 | 3/2013 |
| DE | 102012104275 A1 | 11/2013 |
| EP | 2388064 A1 | 11/2011 |
| WO | 2011/143782 A1 | 11/2011 |

* cited by examiner

FILLING LINE FOR HEAT-TREATING AND FILLING A LIQUID INTO CONTAINERS

RELATED APPLICATIONS

This Application is a National Stage of International Application No. PCT/EP2017/064088 filed Jun. 9, 2017, which claims the benefit of German Patent Application 10 2016 217 342.1 filed Sep. 12, 2016, both of which are incorporated by reference herein.

TECHNICAL FIELD

The present disclosure relates to a filling line for a liquid, in particular, for example, for a beverage or a beverage component such as juice, milk, water or the like. A filling line according to the embodiments of invention is particularly suitable for heat-treating (for example pasteurizing) and subsequently filling the liquid into containers (e.g., bottles).

BACKGROUND

Filling lines in which one or more containers for a liquid can be hot-filled are known from prior art, for example from DE 10 2008 056 597 A1 or DE 10 2011 082 286 A1.

It is also known, for example, from DE 10 2011 082 286 A1 to treat a liquid with heat, for example, to pasteurize it in order to extend the shelf life.

Embodiments of the invention are based on the object of providing an improved filling line with a wider range of applications and/or improved efficiency.

DETAILED DESCRIPTION

Figure 1:
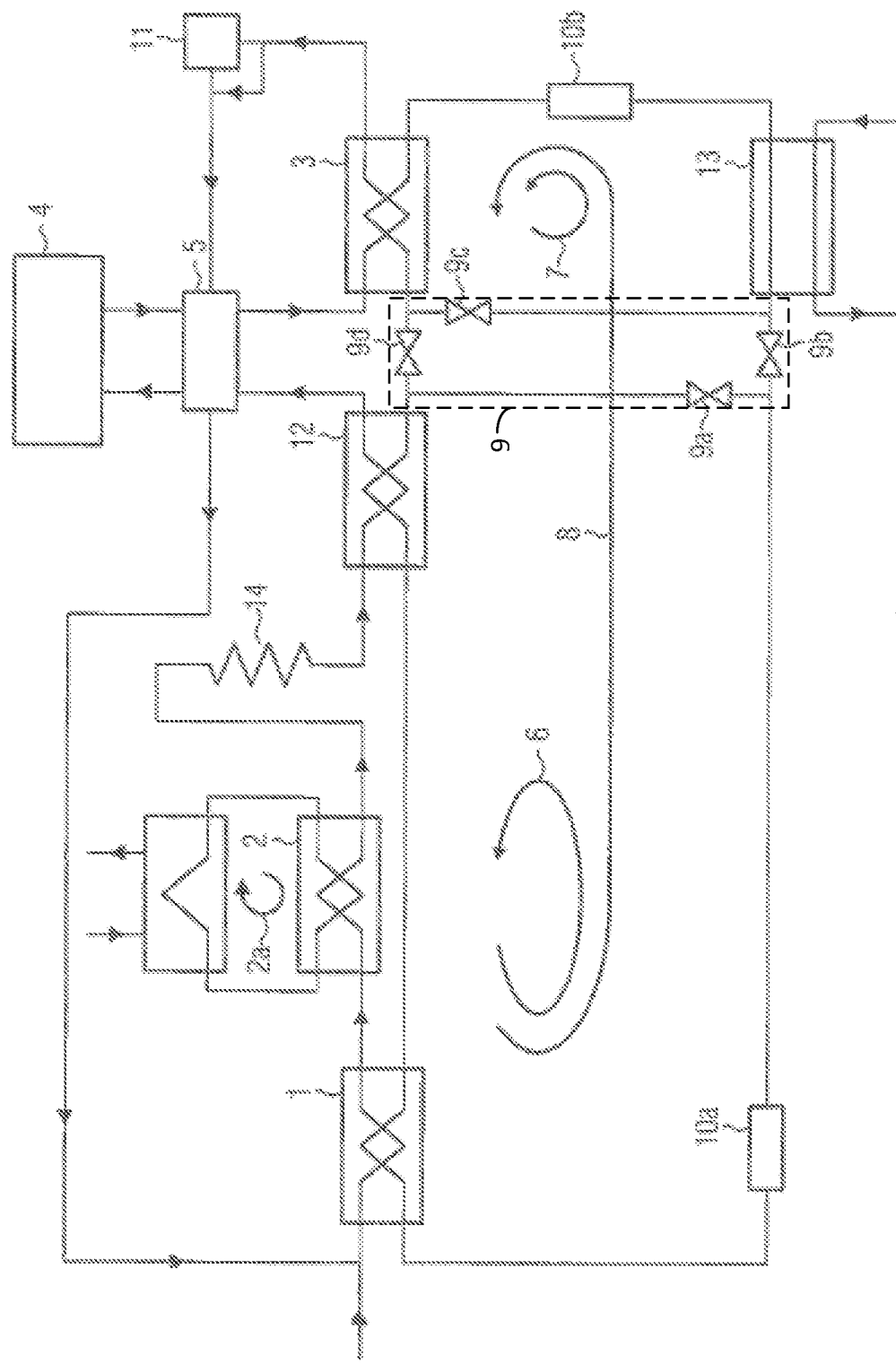
FIG. 1 shows a schematic representation of a filling line.

Embodiments of invention comprise a filling line and a method for heat-treating and filling a liquid into containers. Some further exemplary embodiments are also described.

A filling line for heat-treating and filling a liquid into containers (e.g., bottles) comprises, in particular, a pre-heater for pre-heating the liquid, a heater for heating the liquid after pre-heating (heater for the liquid) and a cooler for cooling down the liquid after heating.

Furthermore, a filling line according to embodiments of the invention comprises a filling unit for filling the liquid. The filling line is suitable for hot filling and cold filling of a liquid. Hot filling is understood to be filling temperatures at 80° C. to 95° C., preferably 85° C. to 90° C. Cold filling temperatures are typically between 1° C. and 20° C., preferably between 4° C. and 10° C. Cold filling can also be understood as filling at room temperature, which takes place at temperatures of 20° C. to 30° C. In a filling line according to embodiments of the invention, the liquid path from the pre-heater to the filling unit for hot filling differs from the liquid path from the pre-heater to the filling unit for cold filling, and the filling line comprises a switching option for switching between the two liquid paths.

The liquid path is typically defined by tubes through which the liquid is conveyed. Individual stations mentioned, such as the pre-heater, the heater and the cooler, through which the liquid is passed, can be configured, for example, as tube sections or a heat exchanger or the like comprising a tube section.

The filling line is suitable for hot filling and cold filling, and configured such that the path through which the liquid in the case of hot filling is to pass is a different liquid path than the liquid path through which the liquid is to pass in the case of cold filling. This can mean, in particular, that existing tubes are passed through in a changed sequence for hot filling and cold filling. The filling line comprises a switching option for switching between the two liquid paths.

The switching option for switching between the two liquid paths can be formed, for example, by way of a panel in which tube ends can be suitably connected using connection members that can be connected and disconnected. Alternatively, the switching option can be formed as a valve cluster which allows connecting different tubes by valves and thereby enables a suitable switch for switching between the liquid path for hot and cold filling. A switching option can comprise, as a further alternative, a combination of a panel and valves.

The heater is typically configured to heat the liquid to a higher temperature than the pre-heater. Possible temperatures for heat-treating (for example pasteurizing), which must be achievable by a heater, are liquid-specific and, can be, for example, between 55° C. and 140° C., in particular, for example, between 75° C. and 100° C.

The pre-heater, the heater, the cooler, and other elements used to treat the liquid are hereinafter also generally referred to as "treatment stations." The treatment stations can each be single-stage or multi-stage (i.e. as one part or several parts), for example in two stages.

The filling line can comprise further treatment stations, for example, additional coolers and/or heaters (both for the liquid and for the secondary circuits, with which heat is supplied to or dissipated from the liquid), a heat retention section in which the liquid can be kept hot after having passed through the heater in order to continue the heat treatment for a certain period of time, and further treatment stations known from liquid treatment such as a degasser and/or a homogenizer which can be arranged, for example, between the pre-heater and the heater or between two stages of a two- or multi-stage pre-heater.

The pre-heater and/or the cooler can each be configured as a heat exchanger. In the following, the term "coolant circuit" is used for the secondary circuit of a heat exchanger, i.e. for the circulation of the medium with which the liquid (to be filled) is supplied heat or with which heat is dissipated from the liquid, and the medium is respectively referred to as "coolant". Of course, such a "coolant" can also be used for heating or stepwise pre-heating. For example, water can typically be used as coolant.

In a filling line, in which both the pre-heater as well as the cooler are configured as heat exchangers, the coolant circuit of the pre-heater and the coolant circuit of the cooler can be operable with a first setting as two separate coolant circuits and be operable with a second setting as one combined coolant circuit.

A filling line can comprise a switch for switching between these two settings. This switch can be configured, for example, in the form of valves or by other known measures.

A filling line is typically operated such that the coolant circuit of the pre-heater and the coolant circuit of the cooler for hot filling are operated using the first setting, i.e. as two separate coolant circuits, and for cold filling using the second setting, i.e. as one combined coolant circuit. This is advantageous because the amounts of heat and the temperatures of the coolant circuits to be transferred are each different.

In the second setting, the coolant circuit can typically be configured such that the return of the cooler (directly or via other stations, for example, through one or more other heat exchangers or the like) is passed to the supply flow of the pre-heater, so that the heat generated at the cooler can be used for pre-heating the liquid. In the second setting, the coolant circuit can be configured such that the coolant can be passed through parts of the two separate coolant circuits in exactly one closed circuit, and is passed through the cooler and the pre-heater as it passes the circuit. This can comprise, for example, that the coolant circuit of the cooler and the pre-heater in the combined coolant circuit coincide. In the second setting (for cold filling), heat recovery is particularly efficient, the cooler is typically designed for 80% to 88% heat recovery.

A filling line can further comprise a trim cooler for cooling the liquid to a certain temperature (typically on the liquid path downstream of the heater and an optional heat retention section). The trim cooler can be arranged in the liquid path between the heater and the filling unit, it can be arranged, in particular, such that it is passed through for hot filling as well as for cold filling. This trim cooler (correction cooler) can be used in hot filling to cool the heated liquid to the filling temperature. In cold filling, it can also be used for slightly cooling the liquid before it passes through the cooler.

A trim cooler can be designed as a heat exchanger.

The trim cooler can be arranged such that its coolant circuit coincides with the coolant circuit of the pre-heater (in both the first and second setting of the coolant circuits) so that coolant from the return of the trim cooler can be used to pre-heat the liquid in the pre-heater.

In another embodiment, the trim cooler is arranged in the filling line such that it exchanges heat between the liquid prior to it passing through the heater and the liquid after it has passed through the heater. In this case, the trim cooler has no coolant circuit but exchanges heat between hot and cold liquids (product/product regeneration).

In other heat exchangers of the filling line, the regeneration of coolant (for example, water) to liquid can take place. The heater and the cooler can be configured as heat exchangers or as conventional coolers (for example with a cooling tower) or heaters (for example by heating with steam).

The filling line can further comprise a tank for holding liquid which is suitable to be used (in particular in hot filling) as a collection tank for collecting an aqueous mixing phase (rework tank), for example like in EP2388064 (Method and device for mixing drinks), and/or, in cold filling as a sterile buffer tank (for example, to compensate for fluctuations in the supply of the liquid).

The liquid path for hot filling in a filling line according to the invention can pass through a pre-heater, a heater, then optionally via a trim cooler, and to the filling unit. Since the filling unit in hot filling is oversupplied typically by about 10% of the rated performance (for example, between 5% and 15% of the rated performance) for it to run in a stable manner, and the discharge system can continue running even in the event of failure of the filling unit, the liquid path for hot filling also provides a path to cool down liquid that has not been filled by way of the cooler and return it to the still unheated liquid (typically prior to the unheated liquid passing through the pre-heater). The filling line is typically configured such that the liquid downstream of the cooler can be passed into the tank or bypass the tank.

The liquid path for cold filling in a filling line according to the invention can run through a pre-heater, then optionally via the trim cooler, via the cooler and then optionally via the tank (if buffering is required) or bypass the tank to the filling unit. Optionally, the liquid path for cold filling can also comprise a path to return liquid that has not been filled to the liquid not yet heated (typically upstream of the passage of the liquid not yet heated through the pre-heater).

The filling line can be configured such that the coolant circuit of the cooler and/or the coolant circuit of the pre-heater comprise a cooler. This means that the respective coolant circuit comprising the cooler is cooled by this cooler. The cooler can be switched on or off, so that it can be connected when needed, and can be configured in any known manner, for example, as a heat exchanger or as other known devices. If the cooler is then formed as, for example, a heat exchanger, it can have a tertiary circuit for a device for cooling the coolant in order to dissipate the heat (for example, into a cooling tower or the like). When the coolant circuits of the pre-heater and the cooler are combined, the cooler(s) can be operable in the combined coolant circuit such that heat from the coolant can be dissipated prior to coolant passing the cooler. Such a cooler can provide, for example, that coolant is cold enough to achieve the desired cooling effect before it passes through the optional trim cooler or cooler.

The coolant circuit of the pre-heater can also comprise a heater which can optional be switched on and off. This means that the coolant circuit can be heated by the heater. For example, the heater can be arranged to heat the coolant prior to the coolant passing through the pre-heater so that the supply temperature of the pre-heater can be raised. This can be useful, for example, for viscous liquids or liquids with poor heat transfer properties, because the same amount of heat can then be transferred without the heat exchanger needing to be enlarged.

The filling line can be configured such that the heater (for the liquid) is designed as a conventional heater which heats the liquid in a known manner, for example, directly or indirectly using steam. The heater (for the liquid) can alternatively or additionally be configured as a heat exchanger. In this case, the coolant circuit of the heater (for the liquid) can coincide with the coolant circuit of the pre-heater. The return temperature from the heater can then be used to pre-heat the liquid. In such an embodiment, a heater is typically comprised in the coolant circuit of the pre-heater (and of the heater for the liquid). The coolant is therefore typically heated by way of a further, for example, external heat source (for example, using steam) before it passes through the heater for being able to transfer a sufficient amount of heat.

The filling line can also be configured such that each separately operable coolant circuit comprises at least one switchable delivery device, for example a pump. At least one switchable delivery device is typically disposed in the coolant circuit of the pre-heater or in the coolant circuit of the cooler such that it is arranged in the interconnected circuit also when the circuits are combined.

A delivery device for moving the liquid can be present also in the path of the liquid. In other embodiments, the liquid can be moved by the pressure of the liquid supplied, so that no delivery device for moving the liquid is needed.

The filling line can comprise a heat swing for heat recovery from the cooler. For example, heat can be recovered from the cooler via a tertiary circuit (a circuit with which heat is supplied to/dissipated from the coolant circuit), which can then be used, for example, for pre-heating. In addition, the coolant circuit of the pre-heater can be supplied heat from other heat sources prior to the coolant passing through the pre-heater (but, of course, also typically after the coolant passed through the trim cooler) such as, for example, heat produced when cooling containers filled with hot fill and/or other waste heat from others processes. One or more tertiary cycles can there be used. The use of (one or more) tertiary circuits to supply heat to/dissipate heat from the coolant circuits for the liquid has the advantage that potentially contaminated tertiary cycles, such as cooling towers, ice water, or the like, can then be separated by the coolant circuit for the liquid and possible contamination of the liquid (the product) can thus be prevented.

The filling line can be configured such that a supply of heat from one or more of the sources mentioned can be effected, for example, by way of a buffer tank in the coolant circuit, for example as disclosed in DE 10 2011 082 286 A1, in particular with reference to FIG. 1 and paras. [0008] [0029]. The disclosure of DE 10 2011 082 286 A1 is presently incorporated by reference.

Application DE 10 2008 056 597 A1 cites examples of heat sources and heat recovery. Such heat sources can also be comprised, in particular, by a filling line according to the invention. The disclosure of DE 10 2008 056 597 A1 is presently likewise incorporated by reference.

An embodiment of invention further comprises a method of heat-treating and filling a liquid into containers in which typically a filling line as described above for heat-treating and filling containers with liquids is employed.

In particular, such a method can comprise hot filling and cold filling. It further comprises switching a liquid path for hot filling by way of a switching option to a liquid path for cold filling and/or switching a liquid path for cold filling to a liquid path for hot filling. Furthermore, it can comprise the step of operating a coolant circuit of the pre-heater and a coolant circuit of the cooler as two separate coolant circuits when hot filling and/or operating the aforementioned coolant circuits as a combined coolant circuit and switching between these two settings using a switch.

FIG. 1 shows a schematic representation of a filling line. By way of example, a pre-heater 1, a heater 2, a cooler 3 and a filling unit 4 are shown there. In addition, a switching option 5 for switching between the liquid path for hot filling and the liquid path for cold filling is shown. As shown in this example, heater 2 can be formed as a heat exchanger with a secondary circuit (coolant circuit) 2a which in turn is supplied by an external heat source, such as steam. In other embodiments, the heater can heat the liquid directly or be formed otherwise (not shown).

In the exemplary embodiment, coolant circuit 6 of the pre-heater and the coolant circuit of cooler 7 are shown, which can each be operated separately. By way of a switch 9 (presently shown by way of example as valves 9a, 9b, 9c and 9d), the coolant circuits of the pre-heater and the cooler can be operated as a combined coolant circuit 8.

Coolant circuit 8 can there be formed such that the return of the cooler is conveyed via valve 9d into the supply of the trim cooler and from the return of the trim cooler into the supply of the pre-heater. (Further treatment stations can optionally be disposed between the treatment stations mentioned.) The heat from the trim cooler can therewith be used to pre-heat the liquid, whereby overall energy consumption of the system can be optimized. Furthermore, optional delivery devices 10a and 10b are drawn in by way of example and can be configured, for example, as pumps or the like in order to drive coolant circuits 6 and 7 or 8, respectively. These delivery devices can be switched on and off, so that they can be used only when needed. In particular, at least one of the two delivery devices (both, in the example shown) can be arranged such that they can convey the coolant also in the combined coolant circuit (for this purpose, they should not be arranged in the regions in which no coolant flows when the coolant circuits are combined).

Furthermore, as shown by way of example in FIG. 1, the filling line can comprise a trim cooler 12 and a heat retention section 14. In particular, trim cooler 12 can be suitable in a hot filling process for cooling down the liquid to a certain temperature for filling (correction cooling).

The coolant circuit of the cooler can optionally comprise a further cooler 13, which can be formed, for example, as a heat exchanger or in another known manner and can dissipate the heat to the exterior. In other embodiments, the filling line can be configured such that the heat thus obtained can be returned to the filling line at another location and used there.

The filling line can further comprise a tank 11 and a bypass line for the tank through which liquid can bypass the tank. The tank can be configured, for example, to be used as a rework tank (e.g., for hot filling) and/or an aseptic buffer tank (for cold filling). FIG. 1 can also comprise further treatment stations as described above (not shown), and the treatment stations shown can each be configured to have two or more stages (also not shown).

In the example shown in FIG. 1, the liquid path runs through a pre-heater 1, a heater 2, a heat retention section 14 and a trim cooler 12 up to the switching option 5. When using the filling line for hot filling, the liquid is then passed into filling unit 4 and filled there. Liquid that has not been filled by the filling unit is returned from the filling unit and passed via a cooler 3, optionally through a tank 11 or through the bypass line for tank 11, via a switching option 5 back to the liquid not yet heated.

For cold filling, the liquid path in the example of FIG. 1 runs through pre-heater 1, heater 2, heat retention section 14 and trim cooler 12 up to switching option 5, from there to cooler 3 and, optionally through tank 11 or through the bypass line for tank 11, via the switching option 5 to filling unit 4. Liquid that has possibly not been filled can then be returned to the liquid not yet heated.

Figure 2:
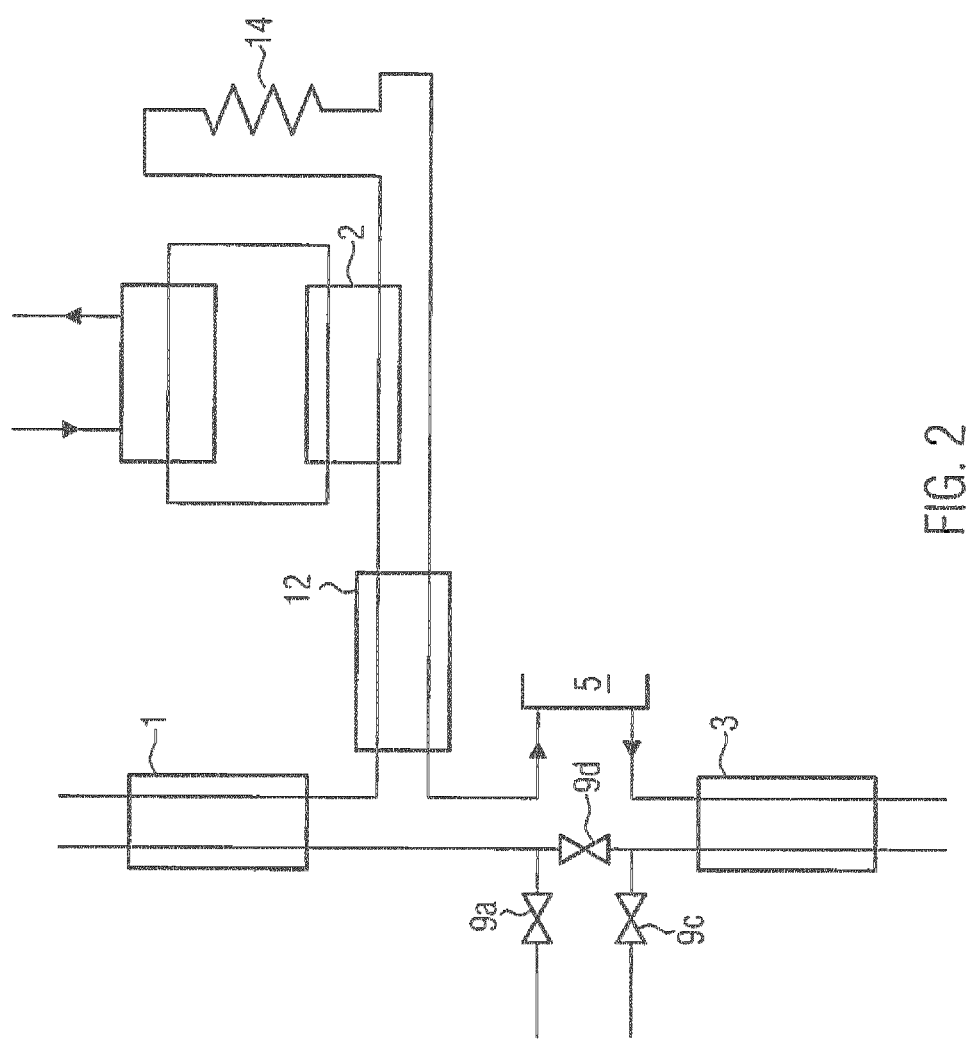
FIG. 2 shows a schematic representation of a section of a filling line.

FIG. 2 shows a section of a filling line with an alternative arrangement and configuration of pre-heater 1, heater 2, trim cooler 12, as it can be used in some embodiments of the invention. Such an arrangement can be comprised, for example, in a filling line as shown in FIG. 1 as an alternative to the arrangement and configuration of the pre-heater, heater and trim cooler shown therein. The optional treatment stations drawn in and components comprised in the filling line can correspond, for example, to the components described in FIG. 1 and, to the extent designated, are designated by the corresponding reference symbols and shall not be explained in more detail.

In the example of FIG. 2, trim cooler 12 is configured such that the liquid is passed through trim cooler 12 on the way to heater 2 and, after passing through heat retention section 14, is returned through trim cooler 12, so that heat can be used for pre-heating the liquid (prior to heating) when the liquid is cooled to the temperature desired after having passed through the trim cooler. In the example shown, trim cooler 12 can therefore also be regarded and act, in particular, as a further pre-heater (or as a second stage of a pre-heater). Direct transfer of heat from the hot to the cold liquid without a secondary circuit is then possible (liquid/liquid regeneration or product/product regeneration).

Figure 3:
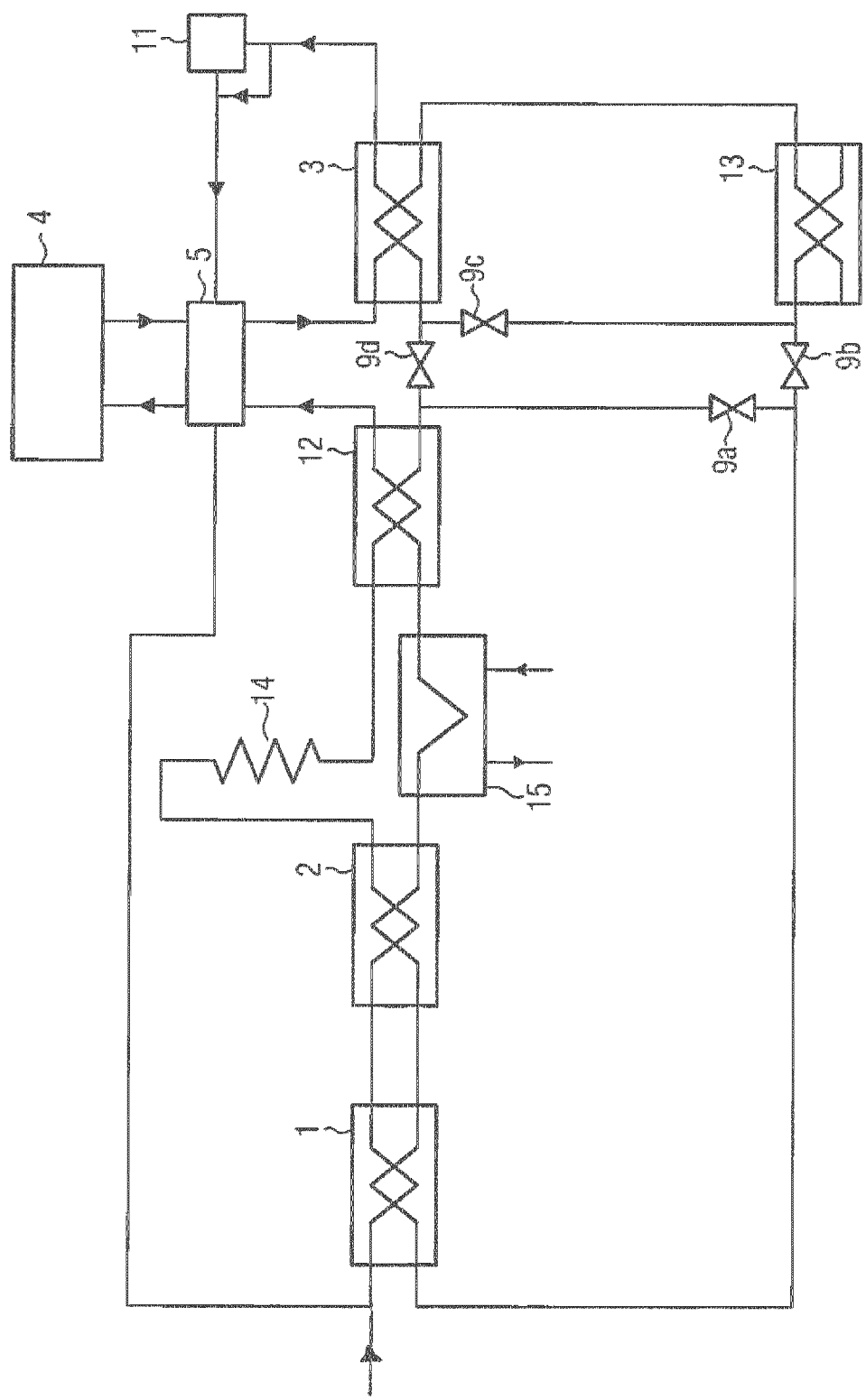
FIG. 3 shows a schematic representation of a filling line.

FIG. 3 shows a further schematic embodiment of a filling line in which the coolant circuit of heater 2 and pre-heater 1 coincide. In particular, coolant from the return of trim cooler 12 can be heated by way of a heater 15 and then passed into the supply of heater 2, where the liquid can be heated. Heater 15 can provide heat in one of the known ways, for example using steam. In the example shown, the coolant from the return of the heater is fed into the supply of the pre-heater, so that remaining heat can be used to pre-heat the liquid. The optional treatment stations additionally drawn in and components optionally comprised in the filling line can correspond to the components described in FIG. 1 and, to the extent designated, are designated by the corresponding reference symbols. They shall therefore not be explained in more detail.

Figure 4:
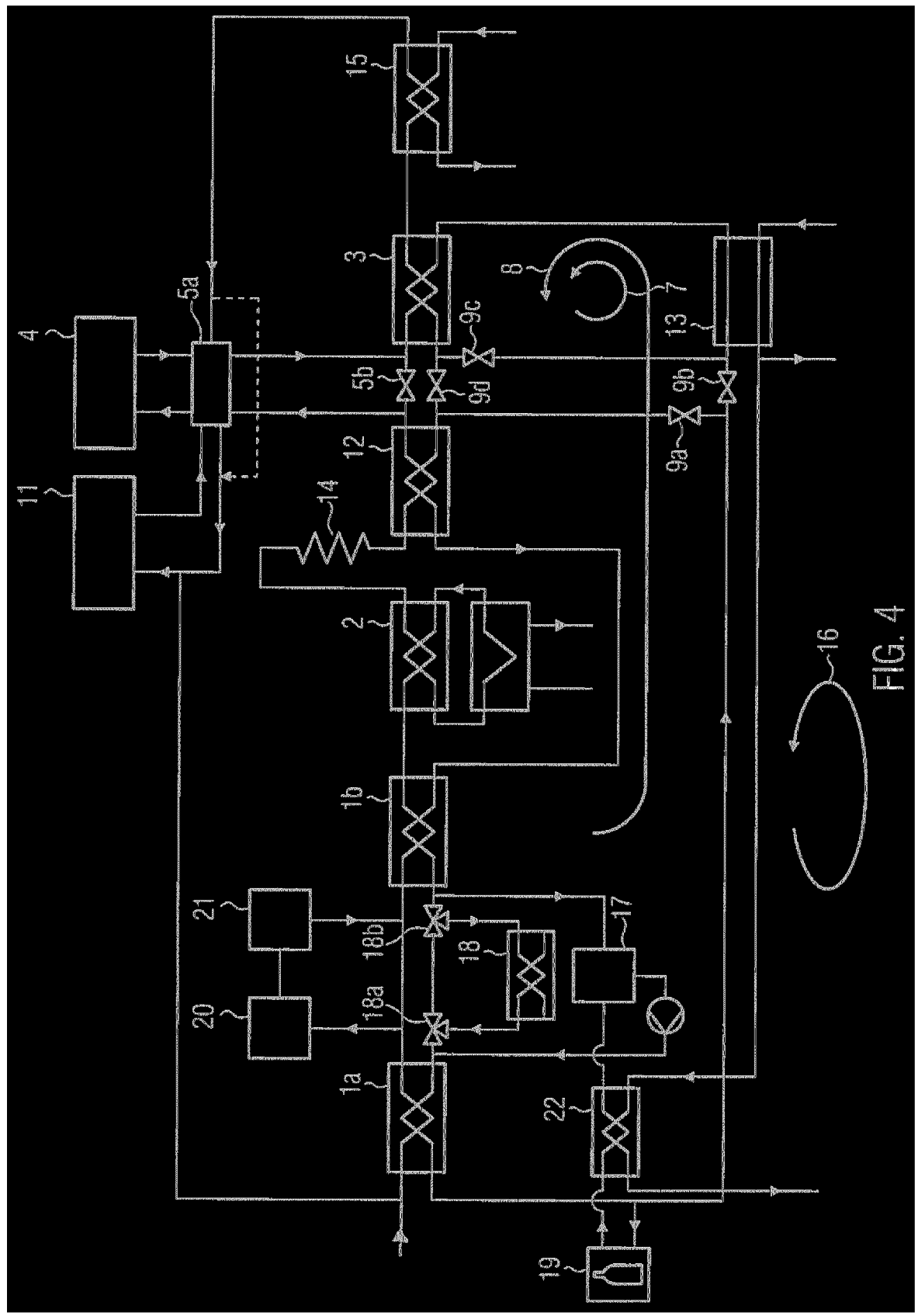
FIG. 4 shows a schematic representation of a filling line.

FIG. 4 shows a further schematic representation of a filling line. The additional or alternative elements shown there can, of course, also be comprised individually in any of the previously described filling lines from FIGS. 1 to 3 or in combination or alternatively to the elements shown there.

The (optional) treatment stations further drawn in and components comprised in the filling line can correspond, for example, to the components described in FIG. 1 and, to the extent designated, are designated by the corresponding reference symbols and shall not be explained in more detail.

In the example shown, the pre-heater is configured as a two-stage pre-heater with pre-heater 1a and pre-heater 1b. Disposed between the two pre-heating stages can be optional treatment stations such as a degasser 20 and/or a homogenizer 21. Coolant circuit 7 of cooler 3 (or coolant circuit 8 of the combined coolant circuit) can be additionally cooled by an optional cooler 13 configured as a heat exchanger, so that the coolant supplied to the cooler has a suitable temperature. Tertiary circuit 16, which is adapted to remove heat from the coolant upstream of the cooler, can be configured to supply heat, presently by way of example via a heat exchanger 22, to a coolant flow which can be delivered to a buffer tank 17. This coolant and in particular buffer tank 17 can also be supplied with heat from further external sources, such as, for example, a bottle cooler 19 shown by way of example, in which bottles are cooled after hot filling, or with waste heat from other sources. The heat can be stored in the buffer tank and delivered to the coolant circuit as needed. By using a buffer tank with multiple heat sources, the heat generated can be transferred evenly to the secondary circuit, even if one or the other heat source now and then provides no heat.

Furthermore, as shown by way of example in FIG. 4, a filling line can comprise a heater 18 which can heat the coolant circuit upstream of pre-heater 1a in a switchable manner (by valves 18a and 18b), so that more heat can be supplied without the pre-heater needing to be enlarged. This can be advantageous in particular with viscous liquids or liquids having poor thermal conductivity capacity, since it can increase heat transfer without requiring enlargement of pre-heater 1a.

It can also be seen in FIG. 4 that the switching option can be configured in several parts, see parts 5a, 5b of the switching option. In addition to valve 5b shown by way of example, in the example shown it also comprises by way of example, region 5a which can likewise be configured as a valve cluster or otherwise, for example, as a panel or the like. Alternatively, the switching option can be configured as a panel, a valve cluster or in another manner (not shown).

Furthermore, as can also be seen in FIG. 4, another cooler 15 can be comprised in the filling line downstream of cooler 3 for suitably adjusting the temperature of the liquid, if it is still too high after passing through the cooler for the liquid to be used. This cooler 15 can be switched on and off as needed and be configured in any manner known from prior art, for example, as a heat exchanger.

It is to be understood that the above description is intended to be illustrative, and not restrictive. Many other embodiments will be apparent upon reading and understanding the above description. Although embodiments of the present disclosure have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A filling line for heat-treating and filling containers with a liquid, comprising:
    a pre-heater configured as a first heat exchanger for pre-heating the liquid, wherein the pre-heater comprises a first coolant circuit;
    a heater for heating the liquid after pre-heating;
    a cooler configured as a second heat exchanger for cooling down the liquid after heating, wherein the cooler comprises a second coolant circuit, and wherein the first and second coolant circuits are operable as separate coolant circuits with a first setting and operable as a combined coolant circuit with a second setting;
    a switch, comprising a plurality of valves, configured to select the first setting or the second setting; and
    a filling unit for filling the liquid;
    wherein the filling line is configured to perform both hot filling and cold filling, wherein a first liquid path from the pre-heater to the filling unit for hot filling differs from a second liquid path from the pre-heater to the filling unit for cold filling; and
    wherein the filling line comprises a switching mechanism for switching between the first liquid path and the second liquid path, the switching mechanism comprising at least one of a) a panel in which tube ends are connectable using connection members that are connectable and disconnectable or b) a valve cluster which allows connections of different tubes by valves.

2. The filling line according to claim 1, further comprising:
    a trim cooler for cooling the liquid to a certain temperature, the trim cooler being located in the filling line such that the liquid passes therethrough after having been heated and prior to passing through the cooler.

3. The filling line according to claim 2, wherein the trim cooler is configured as a heat exchanger.

4. The filling line according to claim 2, wherein the trim cooler comprises a third coolant circuit coinciding with the first coolant circuit so that coolant from a return of the trim cooler is usable to pre-heat the liquid in the pre-heater.

5. The filling line according to claim 2, wherein the trim cooler is arranged in the filling line such that the trim cooler is adapted to exchange heat between the liquid before the liquid passes through the heater and the liquid after the liquid has passed through the heater.

6. The filling line according to claim 2, wherein the first liquid path runs to the filling unit via the trim cooler and, for liquid that has not been filled, via the cooler and one of a tank or a bypass line for the tank, back to liquid not yet heated.

7. The filling line according to claim 2, wherein the second liquid path runs to the filling unit via at least one of the trim cooler, the cooler, a tank or a bypass line for the tank.

8. The filling line according to claim 7, wherein the second liquid path further runs back to liquid not yet heated for liquid that has not been filled.

9. The filling line according to claim 1, wherein the filling line further comprises a tank for the liquid which functions as at least one of a rework tank for hot filling or a sterile buffer tank for cold filling.

10. The filling line according to claim 1, wherein the first liquid path for hot filling runs to the filling unit and, for liquid that has not been filled, via the cooler back to liquid not yet heated.

11. The filling line according to claim 1, wherein at least one of the first coolant circuit or the second coolant circuit comprises an additional cooler, which, when the first and second coolant circuits are combined into the combined coolant circuit with the second setting, is operable also in the combined coolant circuit.

12. The filling line according to claim 1, wherein the heater is configured as a heat exchanger and comprises a third coolant circuit, and wherein the third coolant circuit is combined with the first coolant circuit.

13. The filling line according to claim 1, further comprising:
a plurality of separately operable coolant circuits, where each of the plurality of separately operable coolant circuits comprises at least one switchable delivery device.

14. The filling line according to claim 1, where the filling line comprises a heat swing for heat recovery from the cooler.

15. The filling line according to claim 1, wherein the first coolant circuit comprises an additional heater.

16. The method for heat-treating and filling a liquid into containers using a filling line comprising a pre-heater, a heater, a cooler, and a filling unit, the method comprising:
pre-heating the liquid using the pre-heater, wherein the pre-heater is configured as a first heat exchanger and comprises a first coolant circuit;
heating the liquid, after the pre-heating, using the heater;
cooling down the liquid, after the heating, using the cooler, wherein the cooler is configured as a second heat exchanger and comprises a second coolant circuit; and
filling the liquid into the containers using the filling unit;
wherein the filling line is suitable for both hot filling and cold filling, wherein a first liquid path from the pre-heater to the filling unit for hot filling differs from a second liquid path from the pre-heater to the filling unit for cold filling, and wherein the filling line comprises a switching mechanism for switching between the first liquid path and the second liquid path, the switching mechanism comprising at least one of a) a panel in which tube ends are connectable using connection members that are connectable and disconnectable or b) a valve cluster which allows connections of different tubes by valves;
wherein the method further comprises switching between a first setting and a second setting using a switch comprising a plurality of valves;
operating the first coolant circuit and the second coolant circuit as separate coolant circuits while the first setting is selected; and
operating the first and second coolant circuits as a combined coolant circuit while the second setting is selected.

17. The method according to claim 16, further comprising:
switching from the first liquid path to the second liquid path using the switching mechanism.

18. The method according to claim 16, further comprising:
switching from the second liquid path to the first liquid path using the switching mechanism.

* * * * *